(12) United States Patent
Walden (10) Patent No.: US 10,096,049 B2
(45) Date of Patent: Oct. 9, 2018

(54) PERISHABLE MEDICAL PRODUCT MANAGEMENT SYSTEMS, PERISHABLE MEDICAL PRODUCT MANAGEMENT METHODS, AND PERISHABLE MEDICAL PRODUCT RESALE METHODS

(75) Inventor: Jim Murray Walden, Spokane, WA (US)

(73) Assignee: H-Source, Inc., Spokane, WA (US)

( * ) Notice: Subject to any disclaimer, the term of this patent is extended or adjusted under 35 U.S.C. 154(b) by 1830 days.

(21) Appl. No.: 12/772,019

(22) Filed: Apr. 30, 2010

(65) Prior Publication Data
US 2011/0270708 A1    Nov. 3, 2011

(51) Int. Cl.
G06Q 30/00        (2012.01)
G06Q 30/06        (2012.01)
(Continued)

(52) U.S. Cl.
CPC ......... G06Q 30/0613 (2013.01); G06Q 10/00 (2013.01); G06Q 10/087 (2013.01);
(Continued)

(58) Field of Classification Search
CPC ............... G06Q 30/0613; G06Q 30/00; G06Q 30/0601; G06Q 30/0641; G06Q 10/00; G06Q 10/087
(Continued)

(56) References Cited

U.S. PATENT DOCUMENTS 6,327,576 B1 *  12/2001  Ogasawara ..................... 705/22
6,650,346 B1    11/2003  Jaeger et al.
(Continued)

FOREIGN PATENT DOCUMENTS

EP    117755405    5/2015
GB    2354620      3/2001
(Continued)

OTHER PUBLICATIONS

"Keeping Your Goods in View: Emerging technologies and procedures enable total asset visibility, eliminating blind spots and guesswork," by Merrill Douglas, Frontline Solutions 2.2: 1. Questex Media Group, Inc. (Feb. 2001) (Year: 2001).*
(Continued)

*Primary Examiner* — Anne M Georgalas
(74) *Attorney, Agent, or Firm* — Wells St. John P.S.

(57) ABSTRACT

Perishable medical product management systems, perishable medical product management methods, and perishable medical product resale methods are described. According to one aspect, a perishable medical product management system includes a communications interface, storage circuitry configured to store information regarding a plurality of perishable medical products including information regarding useful lives of the perishable medical products, and processing circuitry coupled with the communications interface and storage circuitry, and wherein the processing circuitry is configured to monitor remaining amounts of time of the useful lives of the perishable medical products, to detect one of the perishable medical products approaching the end of its useful life as a result of the monitoring, and to control the communications interface to output a communication which indicates that the one perishable medical product is approaching the end of its useful life as a result of the detection of the one perishable medical product approaching the end of its useful life.

22 Claims, 4 Drawing Sheets

(51) Int. Cl.
*G06Q 10/00* (2012.01)
*G06Q 10/08* (2012.01)

(52) U.S. Cl.
CPC ......... *G06Q 30/00* (2013.01); *G06Q 30/0601* (2013.01); *G06Q 30/0641* (2013.01)

(58) Field of Classification Search
USPC .............................. 705/26.1, 27.1
See application file for complete search history.

(56) References Cited

U.S. PATENT DOCUMENTS

| | | | |
|---|---|---|---|
| 6,754,636 B1* | 6/2004 | Walker | G06Q 20/00 705/14.26 |
| 6,786,405 B2 | 9/2004 | Wiedenhoefer | |
| 7,237,713 B2* | 7/2007 | White | 235/378 |
| 7,299,981 B2 | 11/2007 | Hickle et al. | |
| 7,464,873 B2* | 12/2008 | Spencer | G06Q 10/087 235/383 |
| 7,657,463 B1* | 2/2010 | Shaw | G06Q 20/203 705/22 |
| 7,685,026 B1* | 3/2010 | McGrady et al. | 705/28 |
| 7,720,708 B1* | 5/2010 | Elkins et al. | 705/14.23 |
| 8,013,022 B2 | 9/2011 | DeAngelo et al. | |
| 2001/0056376 A1* | 12/2001 | Walker | G06Q 10/087 705/15 |
| 2002/0016739 A1 | 2/2002 | Ogasawara | |
| 2002/0099631 A1 | 7/2002 | Vanker et al. | |
| 2005/0186183 A1 | 8/2005 | DeAngelo et al. | |
| 2006/0011720 A1 | 1/2006 | Call | |
| 2006/0089888 A1 | 4/2006 | Roger | |
| 2007/0258960 A1 | 11/2007 | DeAngelo et al. | |
| 2008/0015958 A1 | 1/2008 | Vanker et al. | |
| 2008/0027751 A1 | 1/2008 | Pappalardo | |
| 2008/0269596 A1 | 10/2008 | Revie et al. | |
| 2008/0270270 A1* | 10/2008 | Ramachandra | G06Q 10/087 705/28 |
| 2008/0313060 A1 | 12/2008 | Damodaran | |
| 2009/0204513 A1 | 8/2009 | Tirinato et al. | |
| 2009/0266889 A1 | 10/2009 | Turner et al. | |
| 2009/0313071 A1 | 12/2009 | Hehenberger et al. | |
| 2010/0036755 A1 | 2/2010 | Saghbini | |
| 2011/0257991 A1* | 10/2011 | Shukla | 705/2 |

FOREIGN PATENT DOCUMENTS

| | | |
|---|---|---|
| JP | 2002-024586 | 1/2002 |
| JP | 2002-259778 | 9/2002 |
| JP | 2006-048500 | 2/2006 |
| JP | 2007-026035 | 2/2006 |
| JP | 2006-189991 | 7/2006 |
| JP | 2007-184769 | 7/2007 |
| JP | 2007-323373 | 12/2007 |
| JP | 2013-508230 | 3/2015 |
| JP | 2013-506230 | 2/2016 |
| KR | 10-2007-0078939 | 8/2007 |
| WO | PCT/US2011/034208 | 11/2012 |

OTHER PUBLICATIONS

PCT/US2011/034208, Oct. 20, 2011, Search Report.
PCT/US2011/034208, Oct. 20, 2011, Written Opinion.

* cited by examiner

PERISHABLE MEDICAL PRODUCT MANAGEMENT SYSTEMS, PERISHABLE MEDICAL PRODUCT MANAGEMENT METHODS, AND PERISHABLE MEDICAL PRODUCT RESALE METHODS

TECHNICAL FIELD

This disclosure relates to perishable medical product management systems, perishable medical product management methods, and perishable medical product resale methods.

BACKGROUND OF THE DISCLOSURE

Various business entities consume products during day-to-day operations. Some businesses may maintain an inventory of products on-hand so the products are readily available as a need arises for convenience, immediate use, emergencies, etc. Some products may have relatively long life spans, and accordingly, the products may remain in inventory prior to use of the products. However, for some types of businesses, perishable products may be used to perform various business operations. The values of the perishable products may decrease significantly, perhaps to zero, if they are not consumed or otherwise used prior to their expiration. Furthermore, depending upon the types of perishable products, some products may not be available for return back to the manufacturer, supplier, distributor or other entity from which the products were purchased and the loss of the value of expired, unused perishable products increases the costs of operating the businesses.

At least some embodiments of the disclosure are directed towards apparatus and methods to assist with management of products including perishable products.

BRIEF DESCRIPTION OF THE DRAWINGS

Exemplary embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

According to one embodiment, a perishable medical product management system comprises a communications interface, storage circuitry configured to store information regarding a plurality of perishable medical products including information regarding useful lives of the perishable medical products, and processing circuitry coupled with the communications interface and storage circuitry, and wherein the processing circuitry is configured to monitor remaining amounts of time of the useful lives of the perishable medical products, to detect one of the perishable medical products approaching the end of its useful life as a result of the monitoring, and to control the communications interface to output a communication which indicates that the one perishable medical product is approaching the end of its useful life as a result of the detection of the one perishable medical product approaching the end of its useful life.

According to an additional embodiment, a perishable medical product management method comprises storing information regarding a plurality of perishable medical products, wherein the information includes a plurality of expiration dates which indicate when respective ones of the perishable medical products expire, using the expiration dates, monitoring amounts of time remaining until respective ones of the perishable medical products expire, using the monitoring, detecting one of the perishable medical products approaching one of the expiration dates which is associated with the one perishable medical product, and communicating an indication that the one perishable medical product is approaching an end of its useful life as a result of the detecting.

According to another embodiment, a perishable medical product resale method comprises detecting a perishable medical product approaching an expiration date associated with the perishable medical product, wherein the perishable medical product is within inventory of a medical products consumption entity, as a result of the detecting, generating a communication indicating that the perishable medical product is available for acquisition, and after the communicating, receiving a response indicating a desire of a different entity to acquire the perishable medical product.

At least some aspects of the disclosure include apparatus, methods and programming to assist with management of products which are used to implement business operations including providing assistance with disposal of perishable products which may be nearing the end of their useful lives. For example, a business entity may maintain an inventory of products (consumables) which are used or consumed during operations of the business. Some inventories may include perishable products which may have limited useful lives (e.g., associated expiration dates) after which the products are no longer useful or may have reduced values, perhaps zero value. In one medical example embodiment, hospitals or other medical/healthcare entities (for-profit, nonprofit, etc.) may maintain an inventory of medical products (e.g., implantable devices) which are used for various medical procedures. Some of the medical products may be perishable and have expiration dates after which the medical products may no longer be used in the treatment of patients. According to some illustrative embodiments, apparatus, methods and programming are described to assist entities with disposal of perishable products prior to the end of the useful lives of the perishable products.

Figure 1:
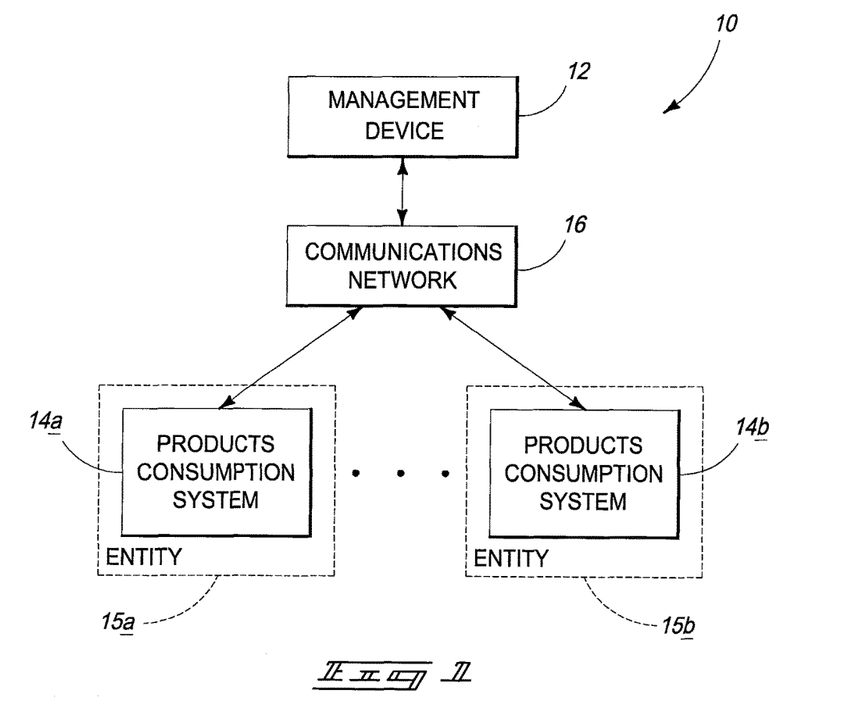
FIG. 1 is a functional block diagram of a perishable product management system according to one embodiment.

Referring to FIG. 1, one embodiment of a products management system 10 is shown according to one possible configuration. The illustrated management system 10 includes a products management device 12 and one or more products consumption systems 14 (two products consumption systems 14a, 14b are shown in the example embodiment of FIG. 1). Products consumption systems 14 may be associated with a plurality of products consumption entities 15a, 15b shown in FIG. 1 which consume or otherwise use products. For example, the entities 15a, 15b may be business entities which use or consume products during business operations and the products consumption systems 14*a*, 14*b* may manage products in inventories of the respective entities 15*a*, 15*b*.

In one embodiment, management device 12 is a server-based computing system and products consumption systems 14 are computing systems associated with the products consumption entities 15 which own products including perishable products which are maintained in respective inventories of the entities 15 for use in one embodiment.

The above-described example embodiment of management system 10 including the management device 12 and production consumption systems 14 is illustrative and other embodiments are possible. For example, in other embodiments, a single entity 15 may utilize a plurality of products consumption systems 14 for management of its products in inventory or a single products consumption system 14 may be associated with and manage products in inventories of a plurality of entities 15. In some embodiments, the products consumption systems 14 implement the management of products in inventories in conjunction with management device 12. In other embodiments, management device 12 may be omitted and the products consumption systems 14*a*, 14*b* provide the management of products for the respective entities 15*a*, 15*b*. In some implementations, a plurality of the products consumption systems 14 may be associated with one another in a common group (e.g., plural different hospitals under a common ownership or management group such as GPOs and IDNs).

Some inventories may include perishable products to be used by the products consumption entities 15. The perishable products may include products which have limited useful lives. In one more specific example, perishable products may have associated expirations dates which define specific dates when the useful lives of the perishable products expire or are otherwise devalued. According to some aspects, the perishable products management system 10 is arranged to assist products consumption entities 15*a*, 15*b* with management of products in inventory and disposal of perishable products which have been previously purchased (or are otherwise within their inventories) and are approaching the ends of their useful lives.

In one example medical application of management system 10 described in further detail below, the products consumption entities 15*a*, 15*b* include health care facilities (e.g., hospitals, Doctor's offices) which utilize products (e.g., valves, stents, catheters, etc.) while providing health care services to patients. Some of the medical products may be perishable and have fixed useful lives. Examples of perishable medical products include implantable devices which are implanted into a patient or otherwise utilized during a surgical procedure and have an associated expiration date setting a fixed useful life for the device, "disposable" or "single use" items which are typically used once and discarded and which may have a fixed useful life, and pharmaceuticals (e.g., drugs) which may also have fixed useful lives. Some entities 15 purchase perishable medical products from manufacturers, suppliers or other sources and maintain respective inventories of the perishable medical products so that the products are available if needed for treatment of patients. However, some of the perishable medical products may be relatively expensive and non-returnable to the entities from which the products were purchased, and the management system 10 may assist with disposal of the perishable products prior to the ends of their useful lives.

In one example, a physician employed at an entity 15 may specify that a certain brand and type of perishable medical product be kept in continuous supply in the inventory of the respective entity 15. The physician may leave the employment of the entity 15 and a subsequent physician may use different brands or types of the perishable medical products leaving the entity 15 with inventory of perishable medical products which will most likely not be used by the entity 15 prior to the expiration of the products.

Accordingly, some perishable products may be purchased and maintained in inventories of the entities 15 but may not be used by the entities 15 prior to the expiration of the useful lives of the perishable medical products. As mentioned above, some of these perishable products have relative significant value (e.g., thousands of dollars each), and accordingly it may be desired to utilize or otherwise dispose of the perishable products prior to the expiration of their useful lives to reduce waste. In some embodiments mentioned above, management system 10 is configured to assist with disposal of the perishable products prior to the expiration of the useful lives of the products. Examples of disposal of perishable products include usage of the products (e.g., implanting the products into patients) or resale or transfer of the products to other products consumption entities 15. Some aspects of the disclosure with respect to assisting disposal of perishable products are described below according to some illustrative embodiments.

Management device 12 is configured to communicate with the product consumption systems 14 in the described embodiment. Any appropriate arrangement for implementing communications may be utilized. In one example, management device 12 and the product consumption systems 14 communicate via an appropriate communications network 16. Communications networks 16 may include one or more suitable arrangements of wired networks, local area networks, wide area networks, the Internet, and/or cellular networks to implement communications. Communications network 16 may be a part of the management system 10 or external of the management system 10 in possible arrangements. Communications network 16 may implement secured communications using one or more private network and may also include firewall functionality to preclude improper parties from accessing one or more components of the management system 10. In one embodiment, communications of the management system 10 described herein and accessing the management system 10 may be secured and parties desiring to send or receive communications and access management system 10 may be required to provide an appropriate password, identification, authentication, and/or other information prior to implementing communications via system 10 (e.g., sending or receiving communications), accessing web pages, advertising products, placing orders for products, or otherwise gaining access to management system 10. In some arrangements, management device 12 may be omitted and products consumption systems 14 may communicate directly with one another via any suitable wired and/or wireless connections.

As mentioned previously in at least one embodiment, management device 12 may be a server-based computing system and products consumption systems 14 may be computing systems used with products consumption entities 15. For example, the systems 14 may be computing systems configured to assist the entities 15 with the day-to-day operations of their businesses (e.g., implement email, schedule patient appointments) as well as assist with the management of products. In other embodiments, the systems 14 may be dedicated systems configured to only implement operations with respect to the management of products of the entities 15.

Management device 12 is configured to manage perishable products of products consumption entities 15 in the described embodiment. For example, systems 14 of the entities 15 may provide information regarding products within their respective inventories to management device 12. The management device 12 may store the information and use the information to assist the entities 15 with disposal of unused perishable products within their inventories prior to expiration of the useful life of the perishable products.

In some illustrative examples, the management device 12 may use information received from the systems 14 (e.g., product identification information, expiration dates) to monitor inventories of perishable products of the entities 15 and generate and provide appropriate communications or alerts that one or more perishable product may be approaching the end of their useful lives. In one embodiment, one or more thresholds may be specified or provided which define one or more timeframes with respect to the expiration date of a perishable product. Example thresholds may define one or more different remaining amounts of time (e.g., different numbers of months) prior to the expiration date of a perishable product where one or more actions may be taken with respect to attempting to dispose of the perishable product.

In one embodiment, management device 12 provides an infrastructure in one implementation to provide a communication to notify the entity 15 which owns the perishable product (i.e., referred to herein as the owner entity) of the approaching expiration. The owner entity 15 may take action in attempt to use or otherwise dispose of the product (e.g., prioritizing usage of oldest products first or actively try to resell or transfer the products to another entity 15). Furthermore, the management device 12 may advertise the perishable products of one entity 15 to other entities 15 for possible resale, transfer, or other disposal of the perishable products prior to the expiration of the useful lives of the perishable products. In one embodiment, the entities 15 may compensate an operator of management system 10 for disposals of their perishable products.

Other implementations of management system 10 are possible. In one alternative embodiment mentioned above, the management device 12 may be omitted and the management system 10 may be implemented by one or more of products consumption systems 14 to assist the respective entities 15 with respect to the management of their respective inventories of products. In one more specific example, the management system 10 may be implemented within one or more products consumption system 14 of the products consumption entities 15 without use of an external device, such as management device 12.

For example, the products consumption system 14 of a respective entity 15 may monitor the products within the inventory of the respective entity 15 and communicate directly with other products consumption systems 14 or other external devices to implement aspects of the disclosure to facilitate disposal of perishable products approaching the ends of their useful lives. Example operations include generating communications such as notifications to staff or administration of the entity 15 of approaching expirations of perishable products and who may take appropriate action with respect to such products. In addition, the products consumption system 14 may also implement communications with respect to external devices (e.g., other products consumption systems 14 of other entities 15) to facilitate disposal of the perishable products, for example by resale or transfer to the other entities 15.

In yet another possible embodiment, a plurality of management devices 12 are provided in management system 10. The management devices 12 may be provided for respective ones of a plurality of groups of products consumption entities 15 (e.g., groups of hospitals owned by a common owner may have its own management device 12 to communicate with products consumption systems 14 of the hospitals and manage the inventories of the respective hospitals as well as communicate with other management devices 12 associated with other groups of hospitals). In one configuration, the management devices 12 may communicate with one another, for example, to offer perishable products of their respective inventories for sale to others of the management devices 12. These example configurations of management system 10 are for illustration and other configurations and/or methods to facilitate disposal of perishable products approaching the end of their useful lives are possible.

Figure 2:
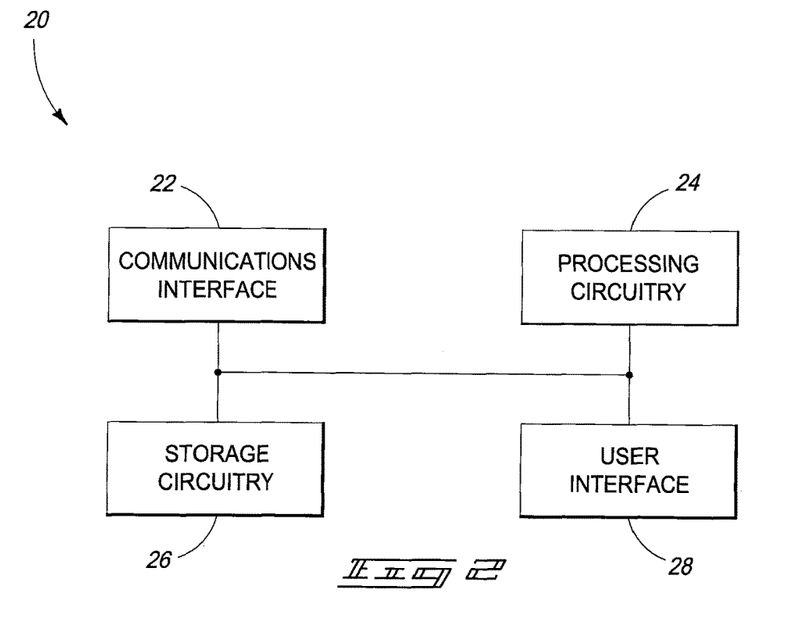
FIG. 2 is a functional block diagram of a computing system according to one embodiment.

Referring to FIG. 2, one example configuration of a computing system 20 is shown. Management device 12 and/or individual ones of products consumption systems 14 may be configured as described with respect to computing system 20 in example embodiments of the disclosure. In the illustrated arrangement, computing system 20 includes a communications interface 22, processing circuitry 24, storage circuitry 26 and a user interface 28. Other configurations of computing system 20 are possible including more, less and/or additional components. Furthermore, management device 12 and products consumption systems 14 may be configured differently in other embodiments.

Communications interface 22 is arranged to implement communications of computing system 20 with respect to external devices (not shown). For example, communications interface 22 may be arranged to communicate information bi-directionally with respect to computing system 20. Communications interface 28 may be implemented as a network interface card (NIC), serial or parallel connection, USB port, Firewire interface, flash memory interface, or any other suitable arrangement for implementing communications with respect to computing system 20.

In one embodiment, processing circuitry 24 is arranged to process data, control data access and storage, issue commands, and control other desired operations. Processing circuitry 24 may comprise circuitry configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other exemplary embodiments of processing circuitry 24 include hardware logic, PGA, FPGA, ASIC, state machines, and/or other structures alone or in combination with one or more processor(s). These examples of processing circuitry 24 are for illustration and other configurations are possible.

Storage circuitry 26 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 26 and configured to control appropriate processing circuitry 24. In an example embodiment where management device 12 or products consumption systems 14 are configured as the described computing system 20, storage circuitry 26 may be configured to maintain a database of products of the products consumption entities 15.

The computer-readable storage medium may be embodied in one or more articles of manufacture which can contain, store, or maintain programming, data and/or digital information for use by or in connection with an instruction execution system including processing circuitry 24 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 28 is configured to interact with a user including conveying data to a user (e.g., displaying visual images for observation by the user) as well as receiving inputs from the user. User interface 28 is configured as graphical user interface (GUI) in one embodiment. User interface 28 may be configured differently in other embodiments. In one embodiment, user interface 28 may be configured to provide alerts to personnel of the management system 10 or entities 15 that one or more perishable products are approaching the ends of their useful lives.

Figure 3:
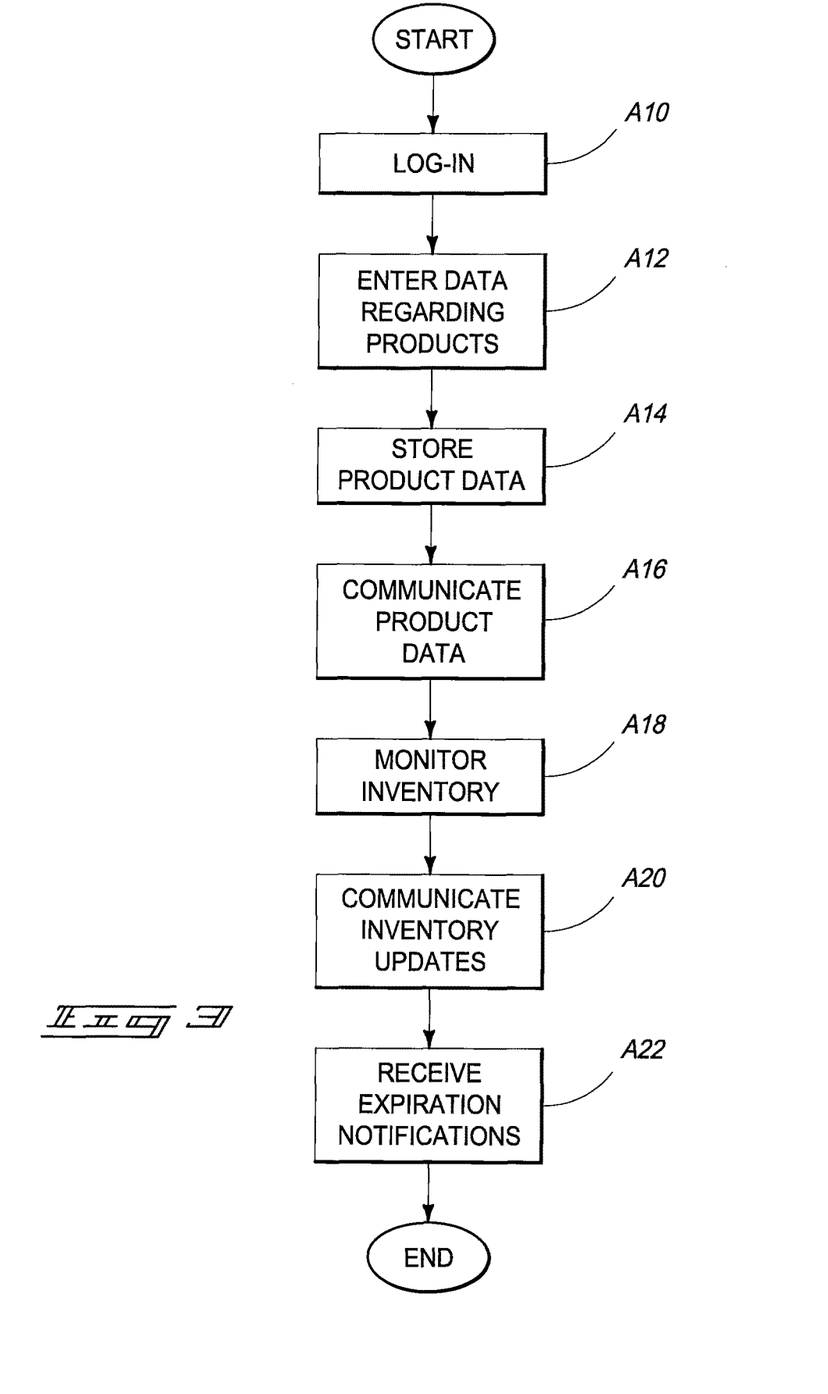
FIG. 3 is a flow chart of a method which may be performed by a products consumption entity according to one embodiment.

Referring to FIG. 3, one example method which may be performed by a productions consumption system 14 of a respective products consumption entity 15 is described according to one embodiment. The illustrated method may be performed by processing circuitry of the system 14 in one arrangement. Other methods are possible including more, less and/or alternative acts.

At an act A10, the products consumption system of the products consumption entity may log-in to the management device. In some embodiments, the management system is a closed system available only to member entities and an identification and password of the products consumption system of the entity may be submitted to the management device to perform the log-in to assure it is an appropriate party to access the management device. In other embodiments, the perishable product management operations described herein are provided in an open system and the management operations are not limited to members only.

At an act A12, a user inputs information regarding the products in its respective inventory into the products consumptions system. The provided information may include identification information which identifies the products. In addition, for perishable products, the provided information may also include information regarding the useful lives of the perishable products (e.g., expiration dates when the products are considered to be expired or otherwise have less value). Furthermore, one or more thresholds may be entered and associated with the products. The thresholds may define different periods of time in advance of the expiration dates to enable different operations to be performed with respect to disposal of products as discussed in additional detail below (e.g., issue alerts, post products for sale, send communications to targeted recipients, etc.). Inputted information may also be verified after entry for accuracy.

In some embodiments, a tracking system may be implemented to provide automated information regarding the status of the inventory (e.g., identification of products, number of products, expiration dates of products, etc.). For example, when products are purchased by the products consumption entity, the products may be associated with a respective bar code or radio frequency identification device (RFID). The products consumption system may be configured to read the bar codes or RFIDs of the products to track and monitor the contents of the inventory of the entity until the products are used, resold, transferred or otherwise removed from inventory. Other systems may be used to track the inventory in other embodiments.

At an act A14, the product consumptions system stores the information regarding a product (e.g., product identification, product expiration, associated thresholds) within a database of its internal storage circuitry.

At an act A16, the products consumptions system provides the information regarding products in its respective inventory to be managed to the management device. The provided information may include identification information which identifies the products. In addition, for perishable products, the provided information may also include information regarding the useful lives (e.g., expiration dates) of the perishable products and the thresholds. The information provided in act A16 may be initial information including information regarding all of the products in the inventory of the respective entity in one embodiment.

At an act A18, the products consumption system of the entity may continue to monitor the inventory of the respective entity. Products which have been used or consumed may be removed from inventory. Furthermore, as mentioned above, an automated monitoring system may be used in some configurations which may include a bar code reader or RFID reader scanning products in inventory at different moments in time to determine the statuses of the inventory. For example, products which have been consumed may be removed from the inventory of products available in the inventory and newly received products may be added to the inventory. Different technologies may be used in some embodiments to assist the products consumption system with monitoring of the inventory of its respective entity. Other embodiments are possible, for example, manual entry of information and monitoring of products in the respective inventory.

At an act A20, the products consumption system may communicate appropriate updates of its respective inventory to the management device in one embodiment. The updates may be communicated according to a period (e.g., daily) in one possible implementation.

At an act A22, the products consumption system may receive communications from the management device in the form of expiration notifications or alerts which identify products and their approaching expiration dates. The products consumption system may perform one or more operation in an attempt to dispose of perishable products which are approaching the end of their useful lives after receiving the notification. Example operations include generating communications such as notifications to staff or administration of the entity of approaching expirations of perishable products who may prioritize use of the identified products. In addition, the products consumption system may also implement communications with respect to external devices (e.g., other products consumption systems of other entities) to attempt to resell or transfer the perishable products to facilitate disposal of the products.

Figure 4:
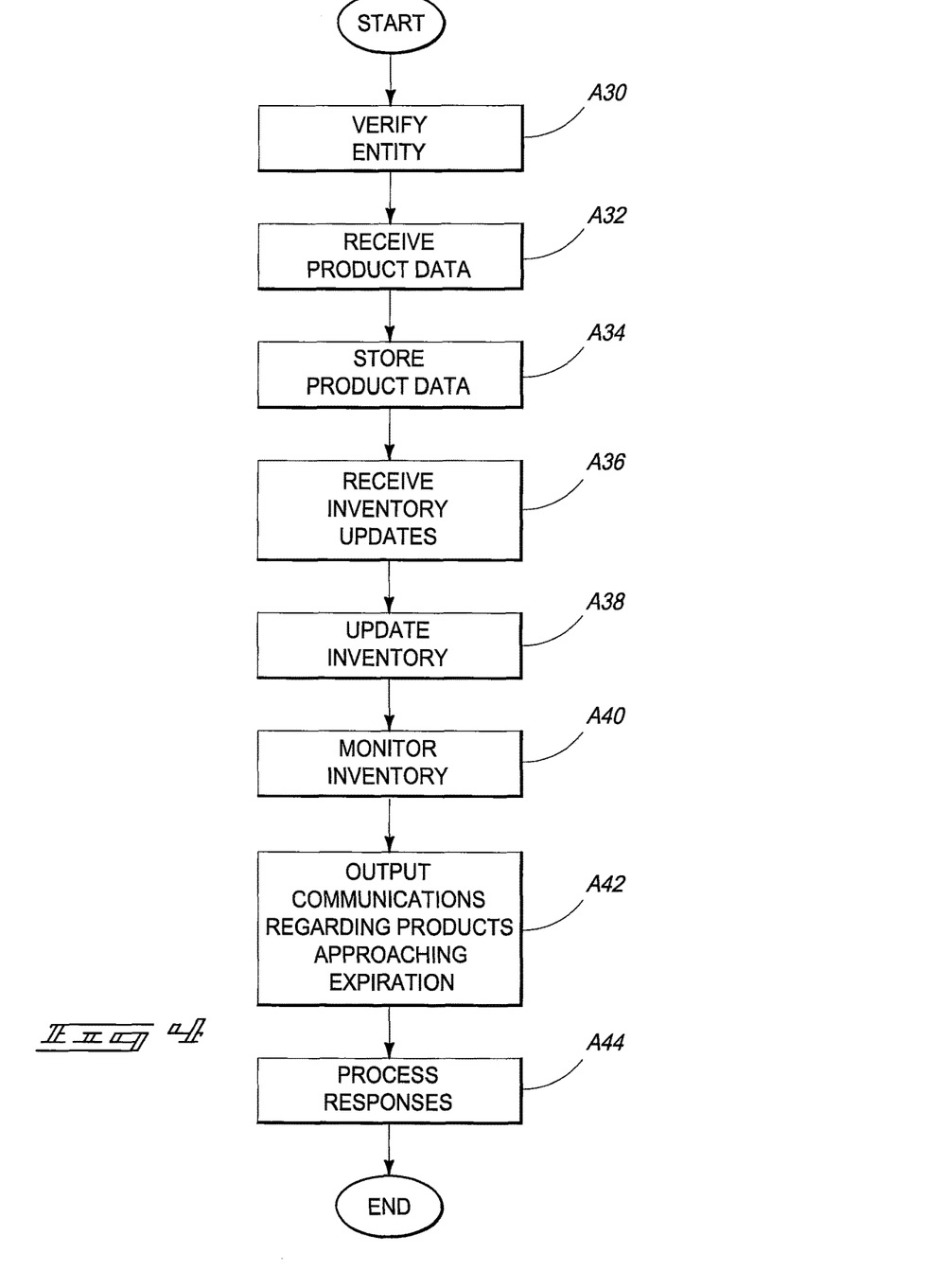
FIG. 4 is a flow chart of a method which may be performed by a management device according to one embodiment.

Referring to FIG. 4, one example method is shown which may be performed by management device 12 according to one embodiment. The illustrated method may be performed by processing circuitry of the management device 12 in one arrangement. The example method is described with respect to one implementation where management device 12 is implemented as a server which may be accessed by a plurality of products consumption systems 14 via the Internet. Other implementations or methods are possible including more, less and/or alternative acts.

Referring to act A30, the management device may perform verification operations with respect to products consumption systems which are attempting to access management device. In one embodiment, the management device may perform operations to authenticate the products consumption systems which attempt to access the management device.

At an act A32, the management device receives product data from one or more products consumption systems which were properly verified. The product data may include a list of products currently in the inventories of the products consumption entities associated with the products consumption systems which are currently providing the product data. The product data may identify whether any of the products are perishable and have fixed useful life. For example, the product data may include the expiration dates and thresholds associated with any products which are perishable.

At an act A34, the management device stores the product data in a database for the respective products consumption entities. An expiration date of a perishable product may be docketed with respect to one or more thresholds of time in advance of the expiration date which may be used to trigger operations with respect to disposal of the respective product as discussed in additional detail below.

At an act A36, the management device may receive inventory updates from the products consumption systems which indicate changes to the inventories compared with the inventories indicated by the product data in act A32. Inventory updates may identify any products which have been consumed (and accordingly the products may be deleted from the inventories) and identify any newly received products (and the products may be added to the inventories).

At an act A38, the management device updates the inventories (e.g., adds and/or removes items) in its database for the respective products consumption entities.

At an act A40, the management device monitors the inventories for the respective products consumption systems being monitored by the management device. The monitoring may be performed on a on-going basis (e.g., daily) in one embodiment. An example of the monitoring includes attempting to determine whether any perishable products are approaching the end of their useful lives. In one more specific example, the monitoring may include checking the expiration dates of any perishable products against the current date to monitor remaining amounts of time of the useful lives of the perishable products and to detect whether one or more of the perishable products are approaching the ends of their useful lives.

As mentioned above, a plurality of thresholds may be docketed with respect to an expiration date of a perishable product. The different thresholds may be specified for different periods of time in advance of the expiration date of a perishable product (e.g., each of six months in advance of the expiration date in one example). The management device may check the docket entries for the perishable products in inventories being monitored with respect to the current date. The management device may take different actions or implement different operations for possible disposal of a product depending on triggering of different thresholds for the product as a result of the monitoring. In one illustrative embodiment, the monitoring of the inventories identifies the products which are approaching the end of their useful lives and the amount of time remaining until the product expires (e.g., between one and six months in the described example).

At an act A42, different operations may be implemented in attempts to dispose of perishable products approaching the ends of their useful lives as indicated by the triggering of one or more thresholds for the products detected in act A40. In some examples described below, the management device may generate and forward communications to one or more recipients which advertise that the perishable product is approaching the end of its useful life and is available for resale, transfer or other disposal and may include information regarding the product. In one example, the perishable product may be offered for resale at a discounted price in consideration of the approaching expiration of the perishable product. Different operations including different communications to different entities may be implemented as a result of the triggering of different thresholds of a given perishable product as discussed below.

In one example embodiment where management device 12 is implemented as a server, management device 12 may update a communication provided via a webpage to include information regarding perishable products which are approaching the ends of the useful lives. The information may include identification information regarding the product. In an example medical application, the product may be a heart valve and the information may include the manufacturer, model number and expiration date of the heart valve. In addition, the information may include the terms to transfer the product. For example, the product may be resold at a reduced price or other conditions may be indicated for which the products consumption entity which owns the product may be willing to dispose of the product. Other products consumption systems (or other entities in some embodiments) may access the website and review the products which are available. In some embodiments, the product may be posted on webpages which may be viewed by different portions of the public. In one example, a webpage may only be viewed by approved member entities who may be required to provide a password. In another example, a webpage may be viewed by the public at large. In one more specific embodiment, a product may be posted on different webpages (e.g., which may be viewed by different portions of the public) depending upon the remaining amount of time before the useful life of the product expires as discussed with respect to a plurality of different tiers below. In some examples, the webpage posting of products may be posted in an auction format which permits different potential purchasers to submit different offers to purchase the products. In other embodiments, a fixed price may be associated with posted products.

In another example, the management device may generate and forward a communication to other products consumption systems of other entities. For example, the management device may communicate the product information of available products directly to products consumption systems of other entities.

In a further example, the management device may also communicate with the products consumption system of the respective entity which owns the perishable product approaching the end of its useful life. For example, the management device may generate the communication as an alarm to notify the owner products consumption system of the approaching expiration date and the entity may implement actions in attempts to dispose of the perishable product (e.g., prioritize the product for first available use). Other operations or communications may be implemented in act A42 in attempts to dispose of the perishable product in additional embodiments.

Furthermore, the above-described aspects may also be implemented with respect to other products. For example, a product (perishable or non-perishable) may be tagged as not needed by an entity and the tagged items may be advertised for resale (e.g., posted on a website of the management device and/or included in direct communications to other products consumption systems).

In one embodiment, a plurality of tiers may be defined and different operations may be implemented for attempting to dispose of products depending upon which tiers the products are associated with at different moments in time. As discussed further below, a perishable product may advance from a first tier to the last provided tier as the perishable product gets closer to its respective expiration date.

One example first tier may be provided which would specify that the perishable products are only made available for resale or transfer to a first class of other products consumption entities (e.g., permissible or specified entities which are associated with the entity which currently owns the perishable product). For example, a group of hospitals may be commonly owned and perishable products posted by one of the members of the group to the website of a private network may be viewed only by members of the same group for possible purchase or transfer. In another example, communications may be sent from the owner entity directly to the other member entities of the group indicating that the perishable product is available.

A second tier could be defined where the owner entity of a perishable product has an existing business relationship, for example, a contractual relationship with other products consumption entities and which may be referred to as a second class of potential purchasers of the perishable product. The perishable product may be viewed on the website of management device 12 by these other entities. In addition, communications may be sent from the owner entity directly to these entities indicating that the perishable product is available.

A third tier could also be provided where perishable products are capable of transfer or resale to a third class of entities. For example, entities of the third class may be entities which are associated with management system 10 (e.g., members of the management system 10) and may be able to view and purchase perishable products from any entities which are available in the third tier. All entities may be available to view the availability of these products via the website of the management system 12 and/or management system 12 may communicate the information regarding the availability of the products in the third tier to the other member entities.

These described different operations with assisting with the disposal of products in different tiers are described for example embodiments of the disclosure and other embodiments are possible.

At an act A44, the management device may process any responses with respect to the perishable products which are available for purchase or other transfer. For example, the management device may receive a purchase request from a purchasing entity who wants to purchase one of the available products. In one embodiment, the management device may authorize the resale or transfer of the perishable product to the purchasing entity. In another embodiment, the management device may forward the purchase request to the owner entity of the perishable product for consideration and perhaps fulfillment in one embodiment. Products which are sold, transferred or otherwise disposed of may be removed from inventory in one embodiment. In some embodiments, the responses to acquire advertised products received by the management device may be analyzed to determine whether the potential purchaser has proper authorization to view information regarding the perishable product and submit an offer for the perishable product (e.g., a password of the author of the response may be verified before allowing access to a website of the management device where details regarding the perishable products may be viewed).

In some embodiments, management system 10 may associate fees with operations which result in the resale or transfer of perishable products. As discussed above in one embodiment, a plurality of different tiers may be provided for the disposal of products. If a perishable product in the first tier is disposed of (e.g., resold or transferred to another entity in the same ownership group or affiliated group of entities), the transaction may be considered to be a simple asset transfer and a minimal (e.g., 0.25%) processing fee could be imposed based on the final transfer price in one example.

Perishable products which are disposed of while being in the second tier may be considered to be resales and a slightly higher (e.g., 0.5%) processing fee may be assessed based on the final resale price.

Perishable products which are disposed of while being in the third tier may also be considered to be resales and a slightly higher (e.g., 1.0%) processing fee may be assessed based on the final resale price.

These examples are for illustration only and other methods may be used to track fees or compensation with respect to disposal of perishable products.

As discussed above, a plurality of different thresholds may be associated with the expiration date of a perishable product. The different thresholds may specific different lengths of time in advance of the expiration date (e.g., 1-6 months prior to the expiration date). Different operations may be implemented with respect to the disposal of a perishable product as a result of different thresholds being triggered.

Figure 5:
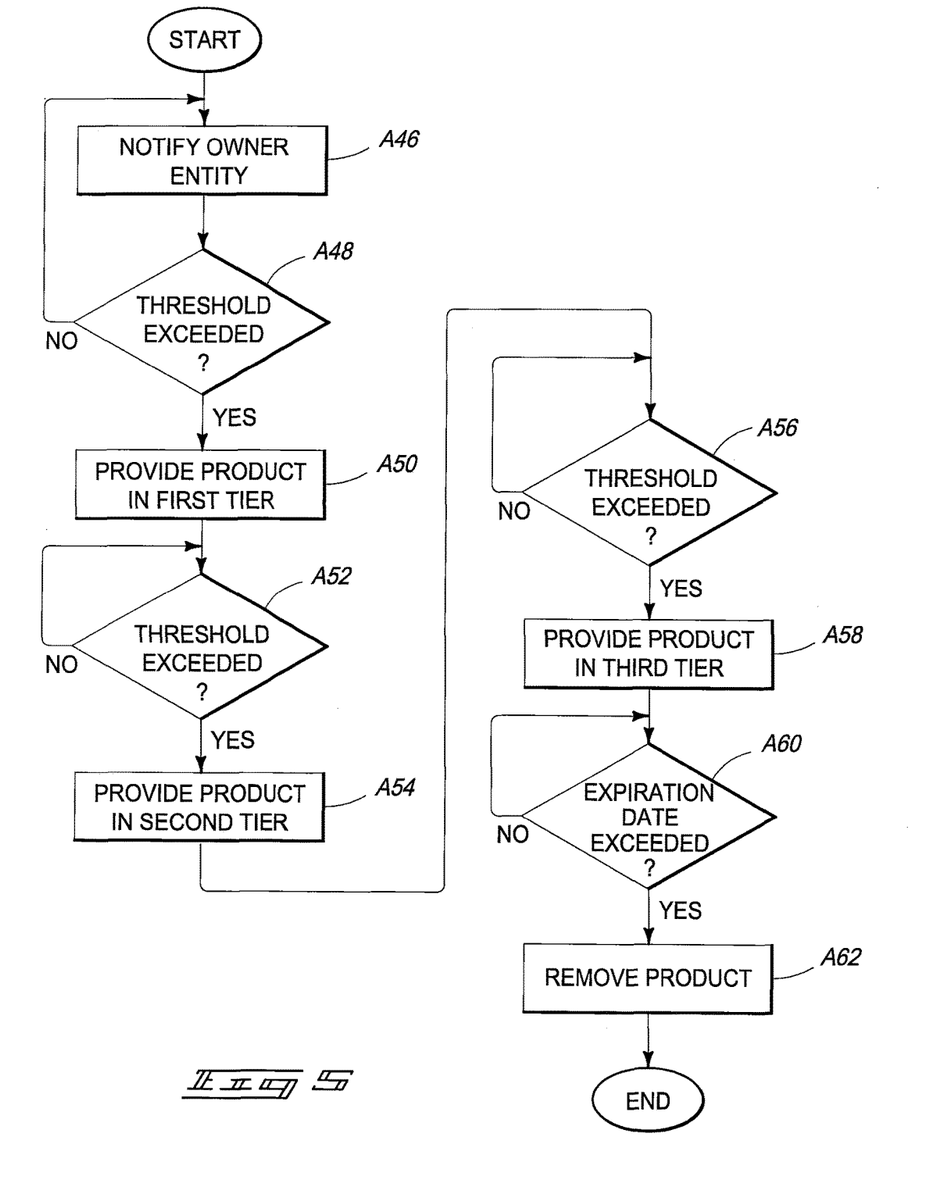
FIG. 5 is a flow chart of a method of providing perishable products in different tiers according to one embodiment.

Referring to FIG. 5, one method for implementing different operations which may be performed depending upon the triggering of different thresholds is described according to one embodiment. The method may be performed by management device 12 in one embodiment. Other methods are possible including more, less and/or alternative acts.

A first threshold may be defined which indicates that a perishable product is approaching the end of its useful life. For example, in one embodiment, a threshold of six months before the expiration date of the perishable product may be docketed. Upon triggering of this threshold, management system 10 may implement operations in an attempt to actively dispose of the perishable product. For example, at an act A46, the owner entity of the perishable product may be notified that the perishable product has a remaining useful life of six months as a result of the first threshold being triggered. The owner entity may attempt to prioritize the respective consumable for immediate use if possible.

At an act A48, it is determined whether a second threshold has been triggered. One example trigger is five months before the expiration date.

If the threshold of act A48 is triggered, the method proceeds to an act A50 where the perishable product is provided in the first tier and operations may be implemented as discussed above to attempt to dispose of the product. Furthermore, another notification alert regarding the expiration date of the perishable product may be sent to the owner entity of the perishable product.

At an act A52, it is determined whether a third threshold has been triggered. One example trigger is four months before the expiration date.

If the threshold of act A52 is triggered, the method proceeds to an act A54 where the perishable product is provided in the second tier and appropriate operations may be implemented as discussed above to attempt to dispose of the product. Furthermore, another notification alert regarding the expiration date of the perishable product may be sent to the owner entity of the perishable product.

At an act A56, it is determined whether a third threshold has been triggered. One example trigger is three months before the expiration date.

If the threshold of act A56 is triggered, the method proceeds to an act A58 where the perishable product is provided in the third tier and operations may be implemented as discussed above to attempt to dispose of the product. Furthermore, another notification alert regarding the perishable product may be sent to the owner entity of the perishable product.

At an act A60, it is determined whether the expiration date of the perishable product has been triggered. If the threshold of act A60 is triggered, the method proceeds to an act A62 where the perishable product is removed from monitoring by the management system 10.

Furthermore, the perishable product may be removed from the monitoring of FIG. 5 at any time if the perishable product is otherwise disposed of prior to act A62.

The above-described acts of the methods of FIGS. 3-5 are implemented using management device 12 and products consumption systems 14 in one described embodiment. Some of the described embodiments provide automated inventory management which may perform numerous operations with respect to monitoring the status of products in inventory, identifying perishable products which may expire in the near future and taking appropriate actions in attempts to dispose of the perishable products prior to expiration with minimal or no human input.

In the specific example embodiment discussed above, the method of FIG. 3 may be performed by products consumption systems 12 and the methods of FIGS. 4 and 5 may be implemented by management device 12 based upon communications with the products consumption systems 14. However, other arrangements are possible to implement operations with respect to the management of perishable products.

For example, in one alternative embodiment mentioned above, the management device 12 may be omitted. Accordingly, some of the acts of FIGS. 3 and 4 may be combined and implemented by a common device. For example, in embodiments wherein the management device 12 is omitted, the products consumption system 14 of a respective entity 15 may implement the management operations for the perishable products within the inventory of the respective entity 15. More specifically, the products consumption system 14 may maintain and manage an inventory of the respective system 14, monitor the useful lives of the perishable products in the inventory and formulate appropriate communications as the useful lives of the perishable products approach their ends. Triggering of different thresholds may result in different operations being performed as mentioned above.

In one more specific example, the system 14 may host a web site advertising the availability of perishable products and which may be accessed by appropriate devices (e.g., other systems 14) for possible acquisition, issue alerts to administrative personnel of the respective entity 15 and/or communicate other indications advertising the availability of the perishable product to other external devices (e.g., advertise the perishable product to products consumption systems 14 of other entities 15). Furthermore, the products consumption system 14 of a respective entity 15 may also receive indications from other systems 14 indicating the availability of perishable products for acquisition from the other entities 15. Other configurations of management system 10 may be used including different infrastructures to manage inventories, monitor perishable products within the inventories and implement appropriate operations in attempts to dispose of perishable products which are approaching the ends of their useful lives.

At least some aspects of the disclosure are directed towards assisting consuming entities with the disposal of perishable products in their inventories. It is believed that operational costs of the entities will be lowered by reducing waste resulting from the expiration of unused perishable products in inventory, or waste resulting from products which are no longer going to be used (e.g., a physician leaves the entity which has an inventory of perishable products previously used by the physician). Some types of perishable products may not be returned to the manufacturer or supplier after purchase as described above, and accordingly, the loss of the value of the products may be perhaps significant to the entities which own the products.

Some of the described embodiments provide an automated system which monitors inventories of products of consuming entities and tracks the remaining useful lives of the perishable products prior to the expirations of the products. In some embodiments, the system may send communications described above (e.g., notifications, indications, alerts as to the status of perishable products) indicating that the perishable products are available for acquisition and the system may process responses received in reply to the communications. As discussed above, one or more of the operations of monitoring inventory, monitoring expirations of perishable products, sending communications, processing responses, facilitating the resale or transfer of the products, and assigning fees for the transfer of products may be automatically implemented with minimal or no intervention of a user according to some embodiments. It is believed that the above-described example embodiments provide improvements over manual arrangements where employees of an entity would call around to different entities in attempts to resell expiring products in the company's inventory. Aspects of the disclosure may also be useful to insurance companies, government entities or other entities which may specify access to the management system to check for available products prior to paying higher prices for the products from manufacturers.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A perishable medical product management system comprising:
   a communications interface;
   storage circuitry configured to store information regarding a plurality of perishable medical products including information regarding useful lives of the perishable medical products;
   processing circuitry coupled with the communications interface and storage circuitry, and wherein the processing circuitry is configured to monitor remaining amounts of time of the useful lives of the perishable medical products, to detect one of the perishable medical products approaching the end of its useful life as a result of the monitoring, and to control the communications interface to output a communication which indicates that the one perishable medical product is approaching the end of its useful life as a result of the detection of the one perishable medical product approaching the end of its useful life;
   wherein the storage circuitry is configured to store the information regarding the useful lives of the perishable medical products including a plurality of different thresholds with respect to remaining amounts of time of the useful lives of the products, and the processing circuitry is configured to detect the one perishable medical product triggering a plurality of the thresholds, and to initiate different operations with respect to attempting to dispose of the one perishable medical product as a result of the triggering of respective ones of the different thresholds; and
   wherein the communication is a first communication, and the processing circuitry is configured to initiate the different operations including controlling the communications interface to output the first communication to a first class of potential acquirers of the one perishable medical product as a result of the processing circuitry detecting a first of the thresholds being triggered with respect to the one perishable medical product and to control the communications interface to output a second communication to a second class of potential acquirers of the one perishable medical product as a result of the processing circuitry detecting a second of the thresholds being triggered with respect to the one perishable medical product, and wherein the first and second classes of potential acquirers are different classes of potential acquirers.

2. The system of claim 1 wherein the storage circuitry stores the information regarding the perishable medical products which have been purchased by a medical products consumption entity and are in inventory of the medical products consumption entity.

3. The system of claim 2 wherein the first and second communications individually comprise an indication that the one perishable medical product is available for resale from the medical products consumptions entity.

4. The system of claim 3 wherein the one perishable medical product remains within the inventory of the medical products consumption entity during the outputting of the indications that the one perishable medical product is available for resale.

5. The system of claim 3 wherein the processing circuitry is configured to control the communications interface to output another communication to an entity other than the medical products consumption entity.

6. The system of claim 2 wherein the processing circuitry is configured to control the communications interface to output another communication as an alarm to the medical products consumption entity.

7. The system of claim 2 wherein the medical products consumption entity comprises a first medical products consumption entity, and further comprising a server which includes the communications interface, the storage circuitry and the processing circuitry, and wherein the server is external of a plurality of medical products consumption entities including the first medical products consumption entity.

8. The system to claim 1 wherein the processing circuitry is configured to control the communications interface to output the first and second communications automatically as a result of the detections and in the absence of any user input which instructs the outputting of the first and second communications.

9. The system of claim 8 wherein the one perishable medical product is within inventory of a first medical products consumption entity, and the processing circuitry is configured to control the communications interface to output another communication to a second medical products consumption entity which has not previously owned the one perishable medical product.

10. The system of claim 1 wherein the processing circuitry is configured to output the first and second communications comprising offers to resell the one perishable medical product to the first and second classes of potential acquirers.

11. The system of claim 1 wherein the one perishable medical product is within inventory of a first medical products consumption entity, and wherein the processing circuitry is configured to control the communications interface to output the first communication to the first class of potential acquirers which are owned by an owner of the first medical products consumption entity, and the processing circuitry is configured to control the communications interface to output the second communication to the second class of potential acquirers which have a contractual relationship with the first medical products consumption entity.

12. The system of claim 1 wherein the communications interface is coupled with a communications network, the perishable medical product management system is implemented as a server, and the communications interface outputs the first and second communications externally of the server for communication via the communications network to indicate that the one perishable medical product is available for acquisition.

13. The system of claim 1 wherein the first and second communications are communicated to computers of the first and second classes of potential acquirers, and the first and second communications each comprise data usable by the computer of a respective recipient to generate a web page which indicates that the one perishable medical product is available for acquisition.

14. The system of claim 1 wherein another communication indicates that the one perishable medical product is available for acquisition via an auction.

15. The system of claim 1 wherein the communications interface is configured to receive a purchase request for the one perishable medical product, and the processing circuitry is configured to process the purchase request and to initiate transfer of the one perishable medical product pursuant to the purchase request.

16. A perishable medical product management method comprising:
   storing information regarding useful lives of a plurality of perishable medical products, wherein the information includes a plurality of different thresholds with respect to remaining amounts of time of the useful lives of the perishable medical products;
   detecting one of the perishable medical products triggering a plurality of the thresholds which are associated with the one perishable medical product;
   initiating different operations with respect to attempting to dispose of the one perishable medical product as a result of the triggering of respective ones of the different thresholds;
   wherein one of the operations includes communicating an indication that the one perishable medical product is approaching an end of its useful life;
   wherein the detecting and initiating comprise detecting and initiating using processing circuitry; and
   wherein the indication is a first indication, and the initiating comprises controlling the communicating of the first indication to a first class of potential acquirers of the one perishable medical product as a result of the detecting a first of the thresholds being triggered with respect to the one perishable medical product and controlling communicating of a second indication to a second class of potential acquirers of the one perishable medical product as a result of the detecting a second of the thresholds being triggered with respect to the one perishable medical product, and wherein the first and second classes of potential acquirers are different classes of potential acquirers.

17. The method of claim 16 wherein the one perishable medical product is within an inventory of a first medical products consumption entity, and further comprising outputting another indication comprising an offer to resell the one perishable medical product to a second medical products consumption entity.

18. The method of claim 16 wherein the one perishable medical product is within an inventory of a medical products consumption entity, and further comprising outputting an alarm to the medical products consumption entity.

19. A perishable medical product resale method comprising:
   storing information regarding a useful life of a perishable medical product including a plurality of different thresholds with respect to remaining amounts of time of the useful life of the product;
   detecting the perishable medical product triggering the thresholds which are associated with the perishable medical product, wherein the perishable medical product is within inventory of a medical products consumption entity;
   initiating a plurality of different operations with respect to attempting to dispose of the perishable medical product as a result of the triggering of respective ones of the different thresholds, and wherein one of the different operations includes generating a communication indicating that the perishable medical product is available for acquisition;
   after the generating, receiving a response indicating a desire of a different entity to acquire the perishable medical product;
   wherein the detecting, generating and receiving comprise detecting, generating and receiving using processing circuitry; and
   wherein the communication is a first communication, and the initiating comprises controlling communicating of the first communication to a first class of potential acquirers of the perishable medical product as a result of the detecting a first of the thresholds being triggered with respect to the perishable medical product and controlling communicating of a second communication to a second class of potential acquirers of the perishable medical product as a result of the detecting a second of the thresholds being triggered with respect to the perishable medical product, and wherein the first and second classes of potential acquirers are different classes of potential acquirers.

20. The method of claim 19 further comprising communicating the response to the medical products consumption entity.

21. The method of claim 19 wherein the receiving comprises receiving as a result of the controlling the communicatings of the first and second communications.

22. The method of claim 19 wherein the detecting comprises detecting using a server which is remote from the medical products consumption entity, and further comprising monitoring a plurality of perishable medical products of a plurality of other medical products consumption entities using the server.

* * * * *

UNITED STATES PATENT AND TRADEMARK OFFICE
CERTIFICATE OF CORRECTION

PATENT NO. : 10,096,049 B2
APPLICATION NO. : 12/772019
DATED : October 9, 2018
INVENTOR(S) : Jim Murray Walden

Page 1 of 1

It is certified that error appears in the above-identified patent and that said Letters Patent is hereby corrected as shown below:

On the Title Page

On Page 2 (56) References Cited:
Replace "JP 2013-506230 2/2016"
With --JP 2013-508230 2/2016--

Signed and Sealed this
Nineteenth Day of March, 2019

Andrei Iancu
*Director of the United States Patent and Trademark Office*